(12) United States Patent
Mori et al.

(10) Patent No.: US 9,746,555 B2
(45) Date of Patent: Aug. 29, 2017

(54) PLANAR ANTENNA AND RADAR APPARATUS

(71) Applicant: Mitsui Engineering & Shipbuilding Co., Ltd., Chuo-ku, Tokyo (JP)

(72) Inventors: Yasunari Mori, Tamano (JP); Kyouji Doi, Tamano (JP); Takayoshi Yumii, Tamano (JP); Yumi Asano, Tamano (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 414 days.

(21) Appl. No.: 14/534,978

(22) Filed: Nov. 6, 2014

(65) Prior Publication Data
US 2015/0130659 A1    May 14, 2015

(30) Foreign Application Priority Data

Nov. 13, 2013    (JP) .................................. 2013-235398

(51) Int. Cl.
| | |
|---|---|
| *H01Q 9/06* | (2006.01) |
| *G01S 7/20* | (2006.01) |
| *G01S 7/22* | (2006.01) |
| *G01S 13/88* | (2006.01) |
| *G01S 13/89* | (2006.01) |
| *H01Q 9/00* | (2006.01) |
| *G01S 7/00* | (2006.01) |
| *G01S 13/00* | (2006.01) |

(52) U.S. Cl.
CPC ............... *G01S 13/89* (2013.01); *G01S 7/20* (2013.01); *G01S 13/88* (2013.01); *H01Q 9/065* (2013.01); *G01S 7/22* (2013.01)

(58) Field of Classification Search
CPC   H01Q 9/04; H01Q 9/06; H01Q 9/065; H01Q 1/12; H01Q 1/22; H01Q 9/0407;
(Continued)

(56) References Cited

U.S. PATENT DOCUMENTS 6,320,545 B1 * 11/2001 Nagumo .................. H01Q 1/22
                                                                  343/700 MS
6,977,613 B2 * 12/2005 He ....................... H01Q 9/0407
                                                                  343/700 MS
(Continued)

FOREIGN PATENT DOCUMENTS

| EP | 1229605 A1 | 8/2002 |
|---|---|---|
| JP | 2002-323459 A | 11/2002 |

(Continued)

OTHER PUBLICATIONS

Office Action of the corresponding Japanese Patent Application Publication No. 2013-235398, dated Aug. 5, 2014.

*Primary Examiner* — Bernarr Gregory
(74) *Attorney, Agent, or Firm* — Global IP Counselors, LLP (57) ABSTRACT

The planar antenna has a dielectric substrate; an antenna main body portion including first and second antenna elements on first and second sides, respectively, of the dielectric substrate and functioning as a balanced antenna; a signal line portion including first and second feed lines on the first and second sides, respectively, and a coplanar line on the first side and formed by a signal line and the first ground conductors, the signal line connected to the first feed line; a second ground conductor on the second side and connected to the second feed line; and via holes connecting the first ground conductors to the second ground conductor provided at ends of edges of the first ground conductors facing the end of the signal line where the signal line connects to the first feed line, to allow the first and second feed lines to function as balanced transmission lines.

20 Claims, 7 Drawing Sheets

(58) Field of Classification Search
CPC .... H01Q 9/0414; H01Q 9/045; H01Q 9/0457;
H01Q 9/30; H01Q 9/42; H01Q 13/10;
H01Q 13/106; H01Q 21/0006; G01S
7/02; G01S 7/04; G01S 7/06; G01S 7/22;
G01S 13/88; G01S 13/89; G01S 7/20;
H01C 21/0006
USPC .......................... 343/824, 850, 865, 700 MS
See application file for complete search history.

(56) References Cited

U.S. PATENT DOCUMENTS

| 2003/0122715 | A1* | 7/2003 | Aikawa | H01Q 9/0457 343/700 MS |
| 2003/0201941 | A1* | 10/2003 | Aikawa | H01Q 13/106 343/700 MS |
| 2005/0088344 | A1 | 4/2005 | Saitou et al. | |
| 2005/0200527 | A1* | 9/2005 | Habib | H01Q 9/065 343/700 MS |
| 2010/0090903 | A1* | 4/2010 | Byun | H01Q 9/0414 343/700 MS |
| 2011/0025574 | A1* | 2/2011 | Tiezzi | H01Q 9/0457 343/824 |
| 2011/0199265 | A1* | 8/2011 | Lin | H01Q 9/42 343/700 MS |
| 2012/0026043 | A1* | 2/2012 | Rida | H01Q 21/0006 343/700 MS |

FOREIGN PATENT DOCUMENTS

| JP | 2005-130292 A | 5/2005 |
| JP | 2010-273204 A | 12/2010 |

\* cited by examiner

PLANAR ANTENNA AND RADAR APPARATUS

CROSS-REFERENCE TO RELATED APPLICATIONS

This application claims priority under 35 U.S.C. §119(a) to Japanese Patent Application No. 2013-235398, filed in Japan on Nov. 13, 2013, the entire contents of Japanese Patent Application No. 2013-235398 are hereby incorporated herein by reference.

BACKGROUND

Field of the Invention

The present invention relates to a planar antenna having a matching circuit patterned on a printed circuit board, and a radar apparatus having array antennas using a plurality of such planar antennas.

Background Information

Conventionally, a three-dimensional imaging radar apparatus is used as a method of inspecting the inside of a structure made of a material (non-metal), such as concrete or wood, in a non-destructive manner. The three-dimensional imaging radar apparatus performs three-dimensional imaging of the inside of the structure by performing a migration process on data measured by a plurality of receiving antennas. Detectable targets include gaps, cavities, metallic matter, regions with different conductivities or permittivities, etc., in the structure. The planar resolution of an image of such a radar apparatus depends on the wavelength of an electromagnetic wave to be used, and the vertical resolution of an image depends on the width of the frequency band of an electromagnetic wave to be used. Hence, to obtain a high-definition, three-dimensional image, it is possible to raise the frequency of an electromagnetic wave used by the radar and to further widen the frequency band of the electromagnetic wave. Currently, the frequency band of the three-dimensional imaging radar apparatus is 100 MHz to 4.5 GHz. Therefore, it is possible to further raise the upper limit of frequencies at which the current three-dimensional imaging radar apparatus operates, and to further widen the frequency band where an electromagnetic wave operates.

In the three-dimensional imaging radar apparatus, a bow-tie shaped planar antenna is effectively used in terms of that the antenna can be made relatively small in size and can achieve a broadband. As such a bow-tie shaped antenna, a planar antenna using a plurality of self-complementary antenna elements is used. As an example of the planar antenna, a planar antenna with a very small reflection loss in an extremely broadband range is known as described in JP 2005-130292 A.

The above-described planar antenna includes a dielectric substrate; a plurality of antenna conductors which are formed on one side of the dielectric substrate and which are pseudo-self-complementary on this side; and a plurality of feeding conductors symmetric with respect to a symmetric plane of the antenna conductors. At this time, a space of ⅟₁₀ or less of the wavelength in a vacuum of a used frequency is provided at the center of a rotational symmetry between the plurality of antenna conductors.

SUMMARY

In general, an unbalanced transmission line such as a coaxial cable or a microstrip line is used as a high-frequency transmission line connected to a self-complementary or pseudo-self-complementary antenna, because a high-frequency circuit is an unbalanced circuit. To feed power, using an unbalanced transmission line, to a bow-tie shaped, self-complementary or pseudo-self-complementary antenna which is a balanced circuit, a balun (balanced-unbalanced converter) is used to suppress generation of unwanted current. In addition, to achieve impedance matching between the antenna and the coaxial cable, the microstrip line, or the like, impedance transformation is required. Some baluns have the impedance transformation function. A balun includes a transformer and thus does not function as a balanced-unbalanced converter at high frequencies of 5 to 20 GHz. Hence, a balun cannot be used in an antenna with a frequency band of 10 to 20 GHz.

An embodiment of the above-described known planar antenna also shows an example in which the widths of feeding conductors are made thinner toward a feed point in order to have the impedance transformation function as shown in FIG. 12 of JP 2005-130292 A. However, in the case of this example, a filter, an amplifier, a coupler, an RF switch, a mixer, and the like, all of which are included in a high-frequency circuit which is described as a balanced circuit in JP 2005-130292 A, are all connected by a Lecher line (balanced circuit). Thus, an unbalanced line such as a microstrip line or a coaxial line cannot be used in the high-frequency circuit.

An object of the present invention is therefore to provide a low-cost planar antenna that operates at high frequencies of, for example, 10 to 20 GHz and in an ultra-broadband that is capable of performing unbalanced-balanced conversion, and a radar apparatus including the planar antenna. Another object of the present invention is to provide a low-cost planar antenna that operates at high frequencies of, for example, 10 to 20 GHz and in an ultra-broadband that has a matching circuit capable of achieving impedance matching between an antenna main body portion and a signal line portion, and a radar apparatus including the planar antenna.

One of the aspects of the disclosed embodiments provides a planar antenna. An embodiment of the planar antenna includes a dielectric substrate; an antenna main body portion including a first antenna element provided on a first side of the dielectric substrate and a second antenna element provided on a second side of the dielectric substrate, with the first antenna element and the second antenna element functioning as a balanced antenna; and a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween. The planar antenna further includes first ground conductors provided on the first side to sandwich the signal line with spacing therebetween, with the first ground conductors forming a coplanar line with the signal line; a second ground conductor provided in an identical region of the second side of the dielectric substrate to a region of the first side where the coplanar line is present, with the dielectric substrate sandwiched therebetween, with the second ground conductor being connected to the second feed line; and via holes connecting the first ground conductors to the second ground conductor provided at ends of edges of the first ground conductors facing the end of the signal line where the signal line is connected to the first feed line, to allow the first feed line and the second feed line function as balanced transmission lines.

As an exemplary embodiment, the signal line portion includes a matching circuit that achieves impedance matching between the antenna main body portion and the signal line portion, by providing two width narrow portions whose line widths get continuously thinner toward a feed point of the first antenna element or the second antenna element in a single line of the signal line portion. One of the width narrow portions that achieve impedance matching is preferably provided on the first feed line.

In an exemplary embodiment, the first antenna element and the second antenna element form self-complementary antenna elements. The first feed line has a first portion whose line width gets continuously thinner toward the feed point, as one of the width narrow portions, the second feed line has a second portion whose line width gets continuously thinner toward the feed point, the signal line has a third portion whose line width gets continuously thinner toward the feed point, as one of the width narrow portions, and the first portion and the second portion are provided at identical locations with the dielectric substrate sandwiched therebetween.

In an exemplary embodiment, the third portion ends at the end of the signal line connected to the first feed line, and the first portion of the first feed line starts from an end of the first feed line connected to the end of the signal line, and when going from the third portion to a connecting portion of the first portion, the line width gets wider so as to have a step between the third portion and the connecting portion. In an exemplary embodiment, a total of a length of the first portion in an extending direction of the first feed line and a length of the third portion in an extending direction of the signal line is equal to a line length from a starting location of the third portion to the feed point of the first antenna element.

In an exemplary embodiment, an extended ground conductors extending from the first ground conductors is provided to cover a perimeter of the first antenna element and to be spaced apart from the first antenna element, and an extended ground conductor extending from the second ground conductor is provided to cover a perimeter of the second antenna element and to be spaced apart from the second antenna element, and a resistance element is provided between each of the first antenna element and the second antenna element and each of the extended ground conductors. In an exemplary embodiment, each of the first antenna element and the second antenna element is preferably connected to each extended ground conductor through the resistance element at a location farthest from each feed points. In an exemplary embodiment, a plurality of via holes that connect the first ground conductors to the second ground conductor are provided along edges of the first ground conductors facing the signal line.

Another one of the aspects of the disclose embodiments provide a radar apparatus. An embodiment of the radar apparatus includes a transmission array antenna that has a plurality of transmission planar antennas arranged therein, with the transmission array antenna operable to radiate an electromagnetic wave to an object. Each of the transmission planar antennas comprises a dielectric substrate; an antenna main body portion including a first antenna element provided on a first side of the dielectric substrate and a second antenna element provided on a second side of the dielectric substrate, with the first antenna element and the second antenna element functioning as a balanced antenna; and a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween. The radar apparatus further comprises first ground conductors provided on the first side to sandwich the signal line with spacing therebetween, with the first ground conductors forming a coplanar line with the signal line; a second ground conductor provided in an identical region of the second side of the dielectric substrate to a region of the first side where the coplanar line is present, with the dielectric substrate sandwiched therebetween, and the second ground conductor being connected to the second feed line; via holes connecting the first ground conductors to the second ground conductor provided at ends of edges of the first ground conductors facing the end of the signal line where the signal line is connected to the first feed line, to allow the first feed line and the second feed line function as balanced transmission lines; and a reception array antenna that has a plurality of reception planar antennas arranged therein, the a reception array antenna being operable to receive an electromagnetic wave reflected from the object.

Each of the reception planar antennas comprises a dielectric substrate; an antenna main body portion including a first antenna element provided on a first side of the dielectric substrate and a second antenna element provided on a second side of the dielectric substrate, with the first antenna element and the second antenna element functioning as a balanced antenna; and a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween. Each of the reception planar antennas also comprises first ground conductors provided on the first side to sandwich the signal line with spacing therebetween, with the first ground conductors forming a coplanar line with the signal line; a second ground conductor provided in an identical region of the second side of the dielectric substrate to a region of the first side where the coplanar line is present, with the dielectric substrate sandwiched therebetween, the second ground conductor being connected to the second feed line; and via holes connecting the first ground conductors to the second ground conductor provided at ends of edges of the first ground conductors facing the end of the signal line where the signal line is connected to the first feed line, to allow the first feed line and the second feed line function as balanced transmission lines; a high-frequency circuit operable to process a receive signal received by the reception array antenna, using a transmit signal used by the transmission array antenna. Each of the reception planar antennas further comprises a signal processing unit operable to obtain a three-dimensional image signal related to the object, using the processed signal obtained by the high-frequency circuit; a system control circuit operable to control transmission by the transmission array antenna, reception by the reception array antenna, a process for the receive signal, and obtaining of the three-dimensional image signal; and an image display unit operable to create a three-dimensional image, using the three-dimensional image signal.

As an exemplary embodiment of the radar apparatus, the high-frequency circuit preferably includes a high-frequency switch operable to select one transmission planar antenna to which the transmit signal is supplied, from within the transmission array antenna; and a high-frequency switch operable to select one reception planar antenna from within the reception array antenna.

As another exemplary embodiment, the embodiment of the radar apparatus further includes: a moving apparatus operable to allow the object to move relative to the radar apparatus; and a sensor operable to output a signal on a set movement distance basis in order to perform transmission by the transmission array antenna and reception by the reception array antenna on a set movement distance basis regarding a movement distance at which the object moves relative to the radar apparatus.

As another exemplary embodiment, the transmission array antenna and the reception array antenna are provided on a single common dielectric substrate, and the reception planar antennas of the reception array antenna are arranged in parallel to an arrangement direction of the transmission planar antennas of the transmission array antenna. As a further exemplary embodiment, the object moves relative to the radar apparatus, and the arrangement direction of the transmission planar antennas of the transmission array antenna and an arrangement direction of the reception planar antennas of the reception array antenna are vertical to a moving direction of the object.

According to one of the embodiments, a low-cost planar antenna operating at high frequencies and in an ultra-broadband which is capable of performing unbalanced-balanced conversion, and a radar apparatus including the planar antenna can be provided. Also, according to one of the embodiments, a low-cost planar antenna operating at high frequencies and in an ultra-broadband which has a matching circuit capable of achieving impedance matching between an antenna main body portion and a signal line portion, and a radar apparatus including the planar antenna can be provided.

DETAILED DESCRIPTION OF EMBODIMENTS

Figure 1A:
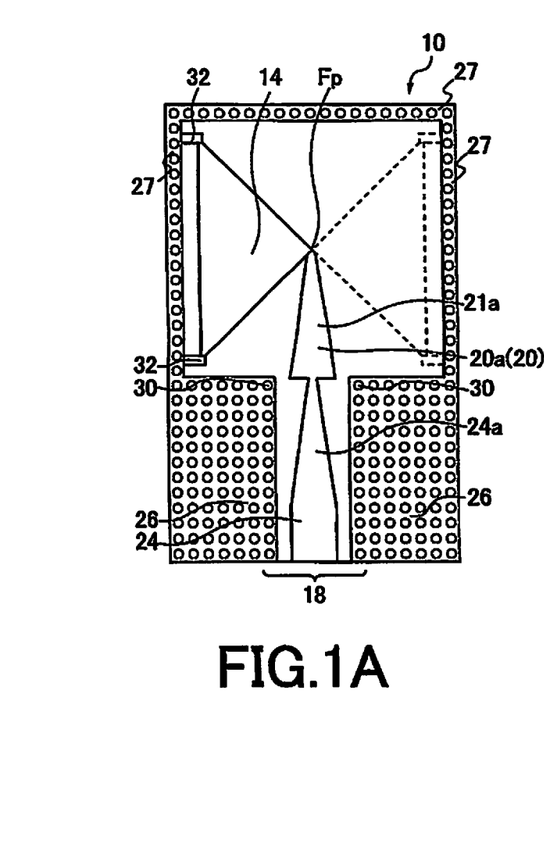
FIGS. 1A to 1C are diagrams for describing an exemplary mode of a planar antenna according to a disclosed embodiment.
Figure 1B:
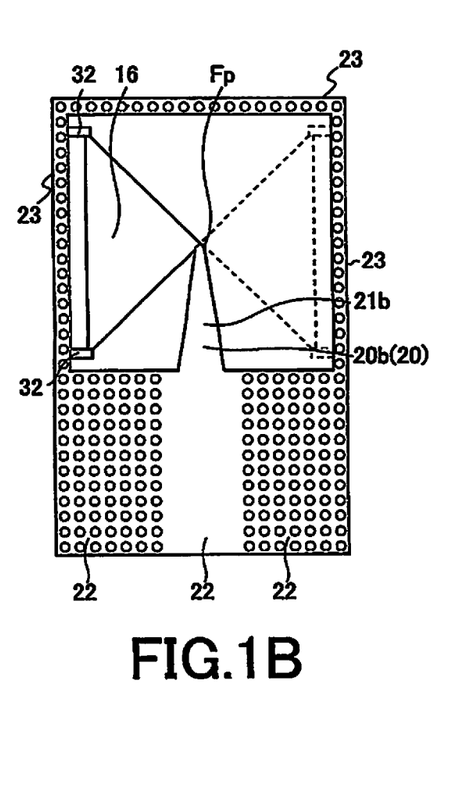
Figure 1C:
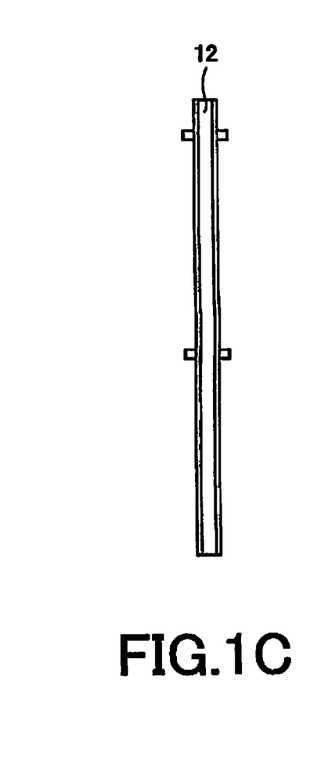

A planar antenna and a radar apparatus according to a disclosed embodiment will be described in detail below. FIGS. 1A to 1C are diagrams for describing a mode of a planar antenna 10 according to a disclosed embodiment. FIG. 1A is a diagram illustrating the front side of the planar antenna 10, FIG. 1B is a diagram illustrating the back side of the planar antenna 10, and FIG. 1C is a diagram illustrating the side of the planar antenna 10.

(Description of the Planar Antenna)

The planar antenna 10 according to a disclosed embodiment is an antenna having a matching circuit patterned on a printed circuit board. The planar antenna 10 operates at frequencies of, for example, 10 to 20 GHz, and is suitably applied to a three-dimensional imaging radar apparatus whose test targets are non-metallic objects.

As illustrated in FIGS. 1A to 1C, the planar antenna 10 of according to this embodiment has an antenna main body portion and a feeding portion. The antenna main body portion functions as a balanced antenna including a first self-complementary antenna element 14 and a second self-complementary antenna element 16 formed on opposite sides of a dielectric substrate 12 which is a printed circuit board.

The dielectric substrate 12 employs a material with a relative permittivity of 1 to 20. For example, glass, glass epoxy resin, or fluorine resin is used. The self-complementary antenna element refers to one of antenna shapes where an antenna region having an infinite-edge antenna element and a slot region having no antenna conductor overlap each other by the antenna region and the slot region rotating or moving. An example includes a rotational symmetry-shaped antenna element having, as its edge, a straight line or curve obtained when a single continuous straight line or curve of the antenna element is rotated 90 degrees about a feed point. The input impedance of an antenna having such a shape is a constant impedance of 188 Ω (substantially 200Ω).

In the example illustrated in FIGS. 1A and 1B, the first antenna element 14 and the second antenna element 16 are formed on surfaces on opposite sides of the dielectric substrate 12, and have isosceles right triangular shapes disposed point-symmetrically with respect to a feed point $F_p$. By rotating the isosceles right triangular shape 90 degrees to the right or left, it overlaps a slot portion where the antenna element is not formed. Therefore, the first antenna element 14 and the second antenna element 16 can be said to be of a self-complementary type. Moreover, since a high frequency is fed to each of the first antenna element 14 and the second antenna element 16 from their feed points $F_p$, the first antenna element 14 and the second antenna element 16 function as a dipole antenna, i.e., a balanced antenna. Note that, as will be described later, to implement infinite-edge antenna elements, resistance elements are provided at ends of the first antenna element 14 and the second antenna element 16 which are farthest from the feed points $F_p$. By this, the first antenna element 14 and the second antenna element 16 function as approximately infinite-edge antenna elements.

The materials of the first antenna element 14 and the second antenna element 16 may be any as long as the materials are conductive. For example, the materials are conductive materials such as copper or silver. The first antenna element 14 is provided on a first side of the dielectric substrate 12, and the second antenna element 16 is provided on a second side of the dielectric substrate 12.

The feeding portion has a coplanar line 18, a pair of feed lines 20, and a second ground conductor 22. The coplanar line 18 includes a signal line 24 provided on the first side of the dielectric substrate 12; and first ground conductors 26 provided to sandwich the signal line 24 with spacing therebetween. The first ground conductors 26 and the second ground conductor 22 are connected to the ground.

The second ground conductor 22 is provided in an identical region of the second side to a region of the first side where the coplanar line 18 including the signal line 24 and the first ground conductors 26 is provided, with the dielectric substrate 12 sandwiched therebetween. Specifically, on the first side and the second side, in an region including antenna regions of the first self-complementary antenna element 14 and the second self-complementary antenna element 16, and self-complementary shaped slot regions where the antenna elements are not present, only the pair of feed lines 20 extending toward the feed points $F_p$ are provided. The signal line 24, the first ground conductors 26, and the second ground conductor 22 are provided in base portions which are on the opposite side of the feed point $F_p$'s side of the pair of feed lines 20.

The pair of feed lines 20 includes a first feed line 20a connecting between an end of the signal line 24 and the feed point $F_p$ of the first antenna element; and a second feed line 20b extending from the second ground conductor 22 and connecting between the second ground conductor 22 and the feed point $F_p$ of the second antenna element 16. Both of the first feed line 20a and the second feed line 20b are provided in the slot regions having no antenna elements. The first feed line 20a and the second feed line 20b are provided at identical locations with the dielectric substrate 12 sandwiched therebetween, and function like parallel feeders. The signal line 24, the first feed line 20a, and the second feed line 20b form a signal line portion.

Figure 2A:
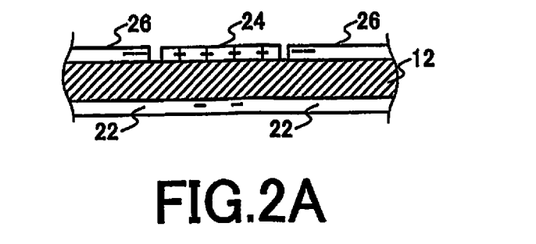
FIGS. 2A to 2C are diagrams for describing an exemplary function of via holes.
Figure 2B:
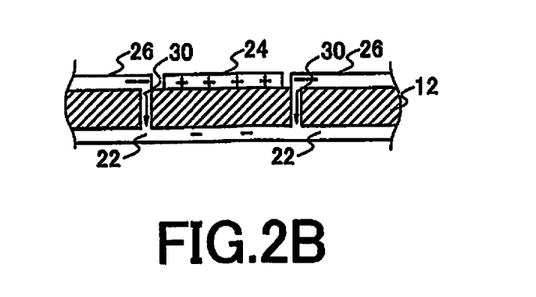
Figure 2C:
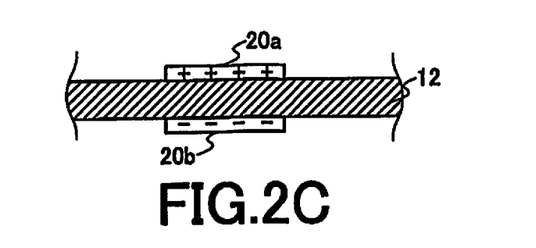

In an exemplary embodiment, via holes 30 that connect the first ground conductors 26 to the second ground conductor 22 are provided at ends of edges of the first ground conductors 26 facing the end of the signal line 24 connected to the first feed line 20a. The via holes 30 can allow charges which are locally generated at the edges of the first ground conductors 26 facing the signal line 24 to flow through the second ground conductor 22 so that the charges can flow through the second feed line 20b. FIGS. 2A to 2C are diagrams for describing the function of the via holes 30. As illustrated in FIG. 2A, when, for example, positive charges flow through the signal line 24, negative charges are locally formed at portions of the first ground conductors 26 and the second ground conductor 22 near the signal line 24. As illustrated in FIG. 2B, when the positive charges move toward the end of the signal line 24, since the signal line 24 is connected to the first feed line 20a, the positive charges flow toward the feed point $F_p$ as current. On the other hand, the negative charges locally generated on the first ground conductors 26 and the second ground conductor 22 flow through the second feed line 20b. At this time, in order that the charges on the first ground conductors 26 can flow into the second feed line 20b from the first ground conductors 26 via the second ground conductor 22 in the shortest time, the via holes 30 that connect between the first ground conductors 26 and the second ground conductor 22 are provided in an exemplary embodiment.

As such, since the via holes 30 that connect the first ground conductors 26 to the second ground conductor 22 are provided at the ends of the edges of the first ground conductors 26 facing the end of the signal line 24 connected to the first feed line 20a, the first feed line 20a and the second feed line 20b function as balanced transmission lines. Namely, a balun is not required.

At this time, since an unbalanced line such as a microstrip line or a coaxial cable (not illustrated) which is connected to the planar antenna 10 has an impedance of 50 SI, the coplanar line 18 is also configured to have an input impedance of 50Ω. On the other hand, since the first antenna element 14 and the second antenna element 16 form a self-complementary antenna, the antenna is a constant impedance antenna having an input impedance of substantially 200Ω (exactly, 188 Ω=60 πΩ). Hence, in an exemplary embodiment, in the feeding portion the impedance is transformed from 50Ω to 200Ω, in terms of a reduction in standing-wave ratio. In terms of this, the first feed line 20a of the planar antenna 10 can have a first portion (narrow width portion) 21a whose line width gets continuously thinner toward the feed point $F_p$ of the antenna main body portion, the second feed line 20b have a second portion (narrow width portion) 21b whose line width gets continuously thinner toward the feed point $F_p$ of the antenna main body portion, and the first portion 21a and the second portion 21b be provided at identical locations with the dielectric substrate 12 sandwiched therebetweeen. In an exemplary embodiment, the first portion 21a and the second portion 21b have identical shapes.

Furthermore, in an exemplary embodiment the signal line 24 have a third portion 24a whose line width gets continuously thinner toward the feed point $F_p$ of the antenna main body portion, the third portion 24a end at the end of the signal line 24 connected to the first feed line 20a, the first portion 21a of the first feed line 20a start from an end of the first feed line 20a connected to the end of the signal line 24, and at a portion where the third portion 24a is connected to the first portion 21a, the line width get wider so as to have a step between the third portion 24a and the first portion 21a when going from the third portion 24a to the first portion 21a. As such, the signal line 24 and the first feed line 20a are provided with the third portion 24a and the first portion 21a, and the second feed line 20b is provided with the second portion 21b, by which the impedance can be transformed from 50Ω to 200Ω. As such, by providing the first portion 21a, the second portion 21b, and the third portion 24a, a portion with the narrowest line width can have a realistically implementable dimension, e.g., 0.6 mm. When the impedance is changed from 50Ω to 200Ω by the third portion 24a without providing the first portion 21a and the second portion 21b, the portion with the narrowest line width has an extremely narrow dimension which is difficult to implement, e.g., 0.1 mm. As such, since the line widths of the first portion 21a, the second portion 21b, and the third portion 24a get continuously and gradually narrower, power reflection loss due to impedance is small. Although in the example illustrated in the drawing each of the line widths of the first portion 21a, the second portion 21b, and the third portion 24a gets linearly and continuously thinner, the line widths are not limited to getting linearly narrower.

As such, in this embodiment, a matching circuit that can achieve impedance matching between the antenna main body portion and the signal line portion and that performs unbalanced-balanced conversion is formed by the first portion 21a and the third portion 24a which are provided on the first side, and the second portion 21b provided on the second side and in an identical region to that of the first portion 21a, with the dielectric substrate 12 sandwiched therebetween.

In an exemplary embodiment, the above-described first portion 21a and second portion 21b for achieving impedance matching are provided at identical locations with the dielectric substrate 12 sandwiched therebetween, in terms of accurate impedance transformation.

The antenna main body portion of the planar antenna 10, of this embodiment includes the first self-complementary antenna element 14 and the second self-complementary antenna element 16 which are provided on the dielectric substrate 12. The first antenna element 14 is provided on the first side of the dielectric substrate 12, and the second antenna element 16 is provided on the second side of the dielectric substrate 12. Namely, the first antenna element 14 and the second antenna element 16 are allowed to function as a balanced antenna. This self-complementary antenna is desirable in the present embodiment in terms of that the antenna has constant impedance and can easily achieve impedance matching.

In an exemplary embodiment, the total of the length of the first portion 21a in an extending direction of the first feed line 20a and the length of the third portion 24a in an extending direction of the signal line 24 are equal to a line length from the starting location of the third portion 24a to the feed point $F_p$, in terms of efficient impedance transformation. In addition, a lower limit length of the above-described total of the length of the first portion 21a and the length of the third portion 24a in the extending direction of the signal line 24 can be a length of 1/10 or more of an effective wavelength (=wavelength in a vacuum/(effective permittivity)$^{1/2}$) in the substrate at a frequency at which the planar antenna 10 operates.

Furthermore, in an exemplary embodiment, a plurality of via holes that connect the first ground conductors 26 to the second ground conductor 22 are provided along the edges of the first ground conductors 26 facing the signal line 24, in terms of stabilization of current which is locally generated at the edges of the first ground conductors 26 and the second ground conductor 22 located around the signal line 24. In this case, via holes are not provided in an identical region of the second ground conductor 22 to that of the signal line 24 with the dielectric substrate 12 sandwiched therebetween.

Furthermore, as illustrated in FIGS. 1A and 1B, extended ground conductors 27 extending from the first ground conductors 26 are provided to cover a perimeter of the first antenna element 14 and to be spaced apart from the first antenna element 14, and extended ground conductors 23 extending from the second ground conductor 22 are provided to cover a perimeter of the second antenna element 16 and to be spaced apart from the second antenna element 16. At this time, resistance elements 32 can be provided between each of the first antenna element 14 and the second antenna element 16 and each of the extended ground conductors 27 and 23, in terms of making the first antenna element 14 and the second antenna element 16 to be infinite-edge antenna elements.

In the example illustrated in FIGS. 1A and 1B, the impedance between the first antenna element 14 and the second antenna element 16 is substantially 200Ω. Thus, two 200-Ω resistance elements 32 are provided in parallel, to each of the first antenna element 14 and the second antenna element 16, i.e., at four locations in total. In this case, both of the first antenna element 14 and the second antenna element 16 can be connected to the extended ground conductors 27 and 23 through the resistance elements 32 at locations farthest from their feed points $F_p$.

Figure 3:
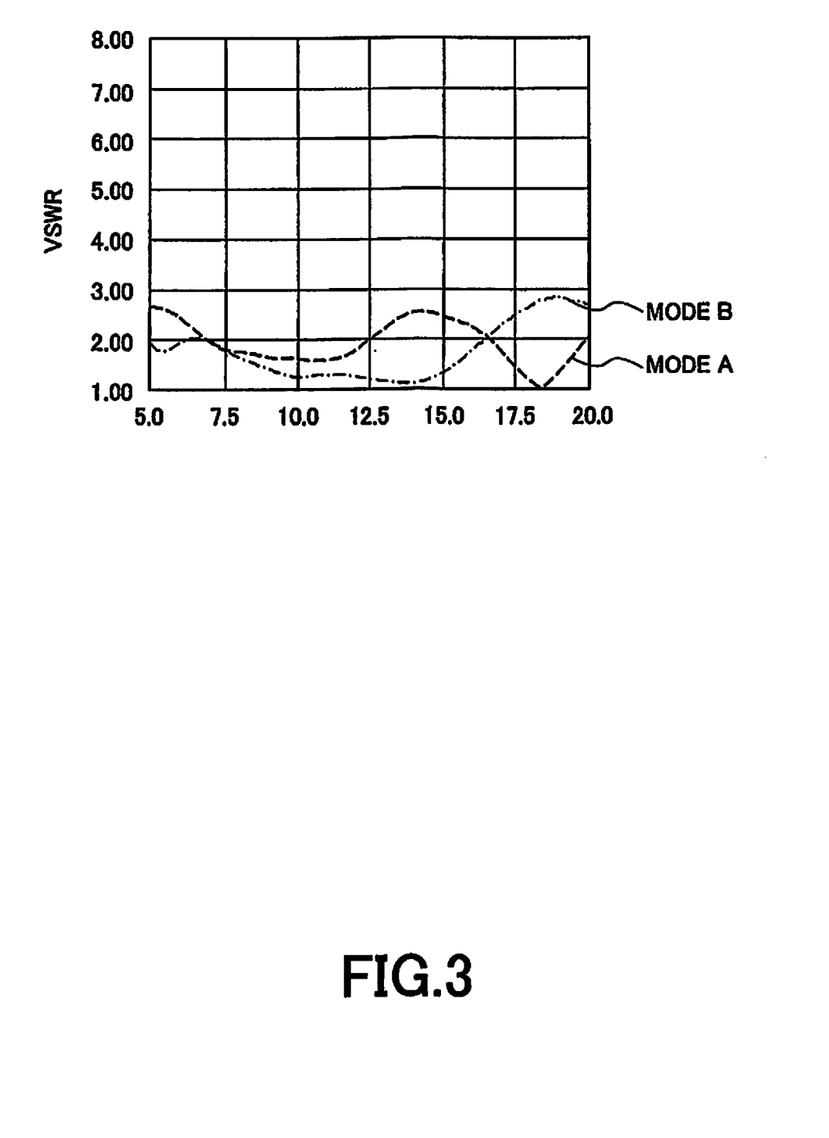
FIG. 3 is a diagram illustrating a graph of an example of the frequency dependence of voltage standing wave ratio (VSWR) for planar antennas (mode A and mode B) of the embodiment shown in FIGS. 1A to 1C.

FIG. 3 is a diagram illustrating a graph of an example of the frequency dependence of VSWR for planar antennas 10 (mode A and mode B). As illustrated in the drawing, the VSWR is 3.00 or less in a broadband of 10 to 20 GHz. Thus, it can be seen that the planar antennas 10 effectively operate in this frequency range.

Figure 4:
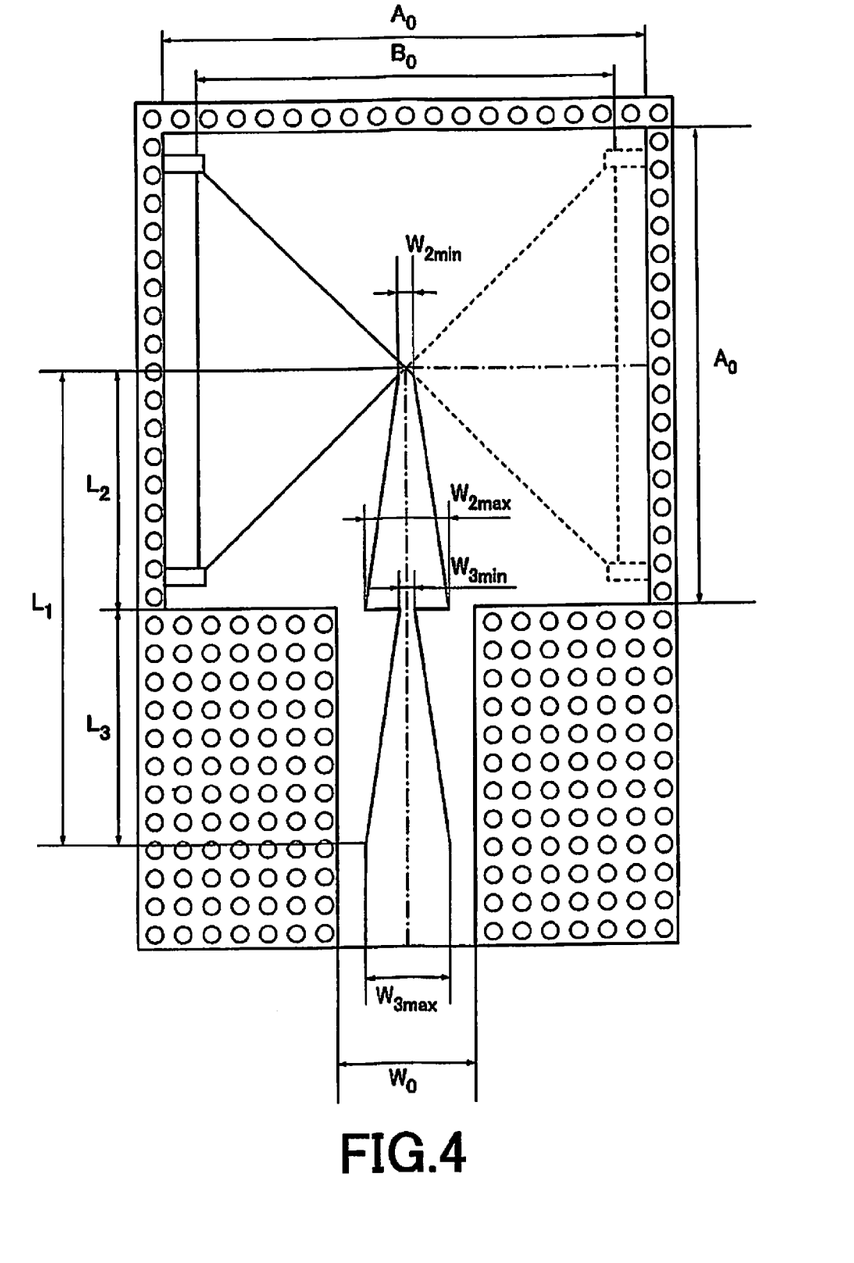
FIG. 4 is a diagram for describing an example of the dimensions of the planar antenna of the embodiment shown in FIGS. 1A to 1C.

Here, the dimensions of modes A and B of the planar antennas 10 are as follows. In the following, the dimensions, etc., of mode B are described in parentheses after the dimensions, etc., of mode A. FIG. 4 is a diagram for describing the dimensions of the planar antenna 10 as set forth below:

Relative permittivity of the dielectric substrate 12: 2.6 (2.6)

Substrate thickness of the dielectric substrate 12: 1.6 mm (1.6 mm)

Length L2 of the first portion 21a and the second portion 21b: 5 mm (6.5 mm)

Length L3 of the third portion 24a: 5 mm (6 mm)

Length L1 is equal to the combined Lengths L2 and L3

Minimum width $W_{2min}$ of the first portion 21a and the second portion 21b: 0.6 mm (0.6 mm)

Maximum width $W_{2max}$ of the first portion 21a and the second portion 21b: 2.1 mm (2.1 mm)

Minimum width $W_{3min}$ of the third portion 24a: 0.9 mm (0.9 mm)

Maximum width $W_{3max}$ of the third portion 24a: 2.5 mm (2.5 mm)

Clearance $W_0$ between the first ground conductors 26 for forming the signal line 24: 3 mm (3 mm)

Size $A_0$ of the antenna main body portion: 10 mm (13 mm)

Total length $B_0$ of the first and second antenna elements: 9 mm (12 mm)

As illustrated in FIG. 3, in both of modes A and B, the VSWR is 3.00 or less in a broadband of 5 to 20 GHz, more preferably, 10 to 20 GHz. As such, the planar antenna 10 is a balanced antenna that operates at high frequencies and in an ultra-broadband. The planar antenna 10 has the matching circuit that achieves impedance matching between the balanced antenna main body portion and the unbalanced signal line portion and performs balanced-unbalanced conversion, by providing two portions (the first portion and the third portion) whose line widths get continuously thinner toward the feed point, in a single line of the signal line portion, through which a signal is transmitted. Thus, the planar antenna 10 can be implemented on a printed circuit board without using a balanced-unbalanced converter such as a balun. Since the planar antenna 10 does not require a balun, the planar antenna 10 can be used as a low-cost antenna with a simple configuration.

Figure 5:
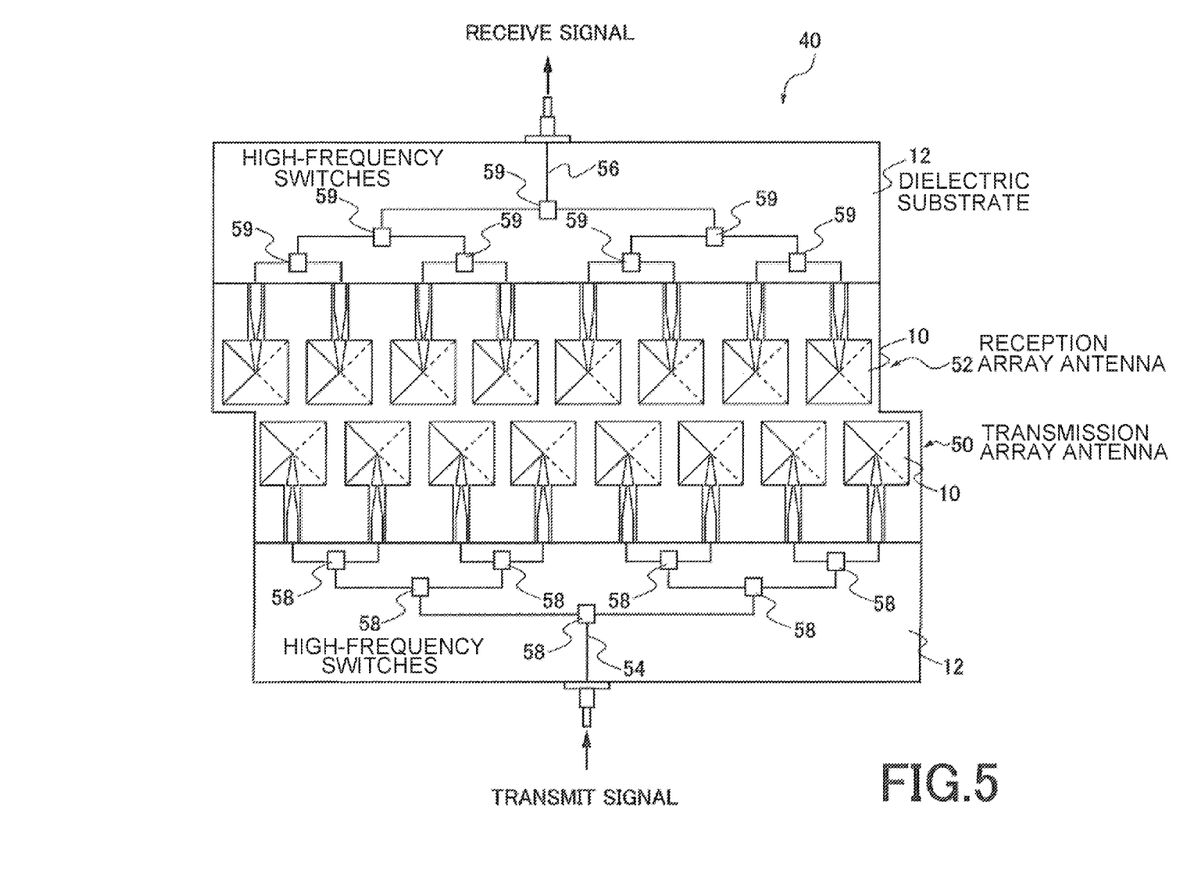
FIG. 5 is a diagram illustrating a configuration of an example of a transmitter and receiver module including a transmission array antenna and a reception array antenna that include planar antennas of the embodiment shown in FIGS. 1A to 1C.

As illustrated in FIG. 5, by using a plurality of such planar antennas 10, they can be used as an array antenna. FIG. 5 is a diagram illustrating a configuration of an example of a transmitter and receiver module 40 including a transmission array antenna 50 and a reception array antenna 52.

The transmission array antenna 50 and the reception array antenna 52 are formed on a common dielectric substrate 12. Specifically, as the transmission array antenna 50, a plurality of planar antennas 10 illustrated in FIGS. 1A to 1C to 4 are formed on the dielectric substrate 12, and as the reception array antenna 52, a plurality of planar antennas 10 illustrated in FIGS. 1A to 1C to 4 are formed on the dielectric substrate 12. The arrangement direction of the planar antennas 10 of the transmission array antenna 50 is parallel to the arrangement direction of the planar antennas 10 of the reception array antenna 52. At this time, as illustrated in FIG. 5, the location in the arrangement direction of each planar antenna 10 of the reception array antenna 52 can be in between two locations of adjacent planar antennas 10 of the transmission array antenna 50. Note that the locations in the arrangement direction of the planar antennas 10 of the reception array antenna 52 may be allowed to coincide with the locations in the arrangement direction of the planar antennas 10 of the transmission array antenna 50.

In addition, as illustrated in FIG. 5, a signal line 54 can be branched into two signal lines by a tournament form, and this branching be repeated three times so that a transmit signal to be transmitted to each planar antenna 10 of the transmission array antenna 50 can be finally supplied to a single specific transmission planar antenna 10 among, for example, eight planar antennas 10. Also, for a receive signal to be outputted from each planar antenna 10 of the reception array antenna 52, too, as illustrated in FIG. 5, each signal line can be connected by a tournament form, and a receive signal from a single specific reception planar antenna 10 be outputted to a signal line 56. The tournament form refers to that, in the case of a transmit signal, one signal line is branched into a plurality of signal lines, and the lengths of the signal lines obtained after the branching are equal to each other. Likewise, in the case of a receive signal, too, the tournament form refers to that a plurality of signal lines are merged into one signal line, and the lengths of all of the signal lines are equal to each other. By thus using signal lines in the tournament form, identical-phase transmit signals can be supplied to the planar antennas 10, eliminating the need to perform correction of a phase shift caused by line length, on receive signals from the planar antennas 10.

Branching portions and merging portions of the signal lines in the tournament form are provided with high-frequency switches 58 and 59. Thus, a planar antenna 10 allowed to radiate an electromagnetic wave using a transmit signal can be selected from the transmission array antenna 50, and a planar antenna 10 to capture a receive signal can be selected from the reception array antenna 52. Such high-frequency switches 58 and 59 are controlled according to instructions from a system control circuit (not illustrated).

Figure 6:
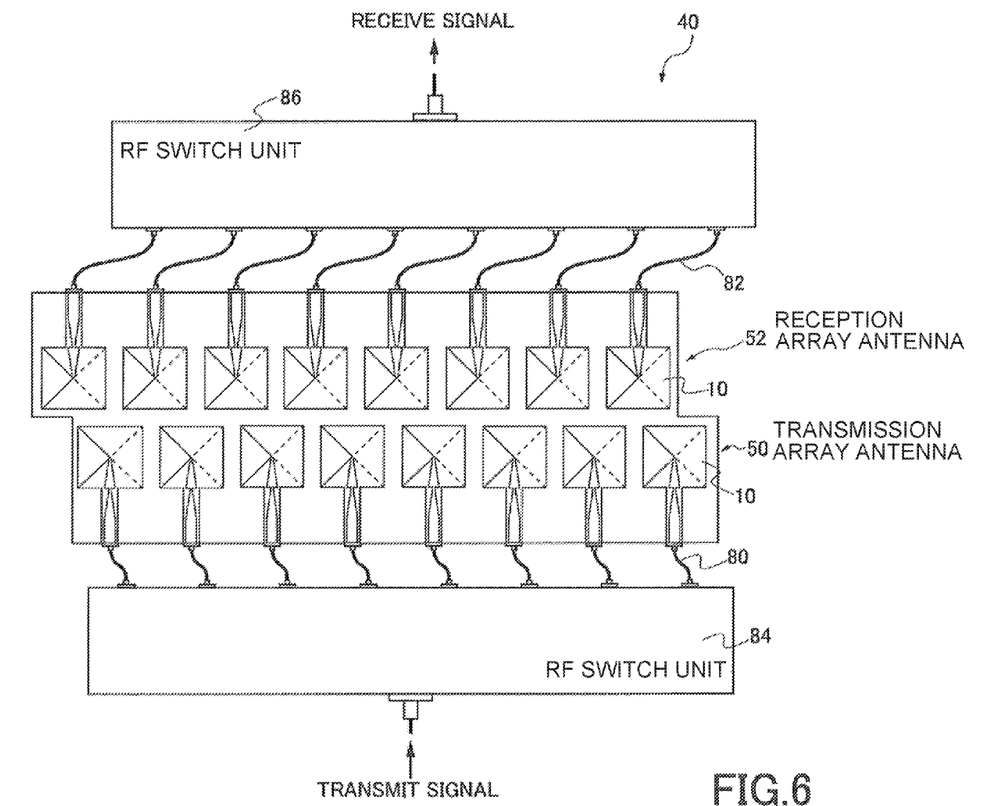
FIG. 6 is a diagram illustrating an example of a configuration different than that of the transmitter and receiver module illustrated in FIG. 5.

FIG. 6 is a diagram illustrating an example of a configuration different than that of the transmitter and receiver module 40 illustrated in FIG. 5. A transmitter and receiver module 40 also has a transmission array antenna 50 and a reception array antenna 52. Signal lines 24, first ground conductors 26, and second ground conductors 22 of planar antennas 10 of the transmission array antenna 50 and the reception array antenna 52 are connected to coaxial cables 80 and 82. A transmit signal is supplied to the transmission array antenna 50, and a receive signal is outputted from the reception array antenna 52. The transmitter and receiver module 40 has RF switch units 84 and 86. One planar antenna 10 in the transmission array antenna 50 which is a supply destination to which a transmit signal is supplied, and one planar antenna 10 in the reception array antenna 52 are selected by control signals from a system control circuit (not illustrated). The configuration illustrated in FIG. 6 differs from that illustrated in FIG. 5 in that the transmission array antenna 50 and the reception array antenna 52 are connected to the RF switch units 84 and 86 by the coaxial cables 80 and 82.

Figure 7:
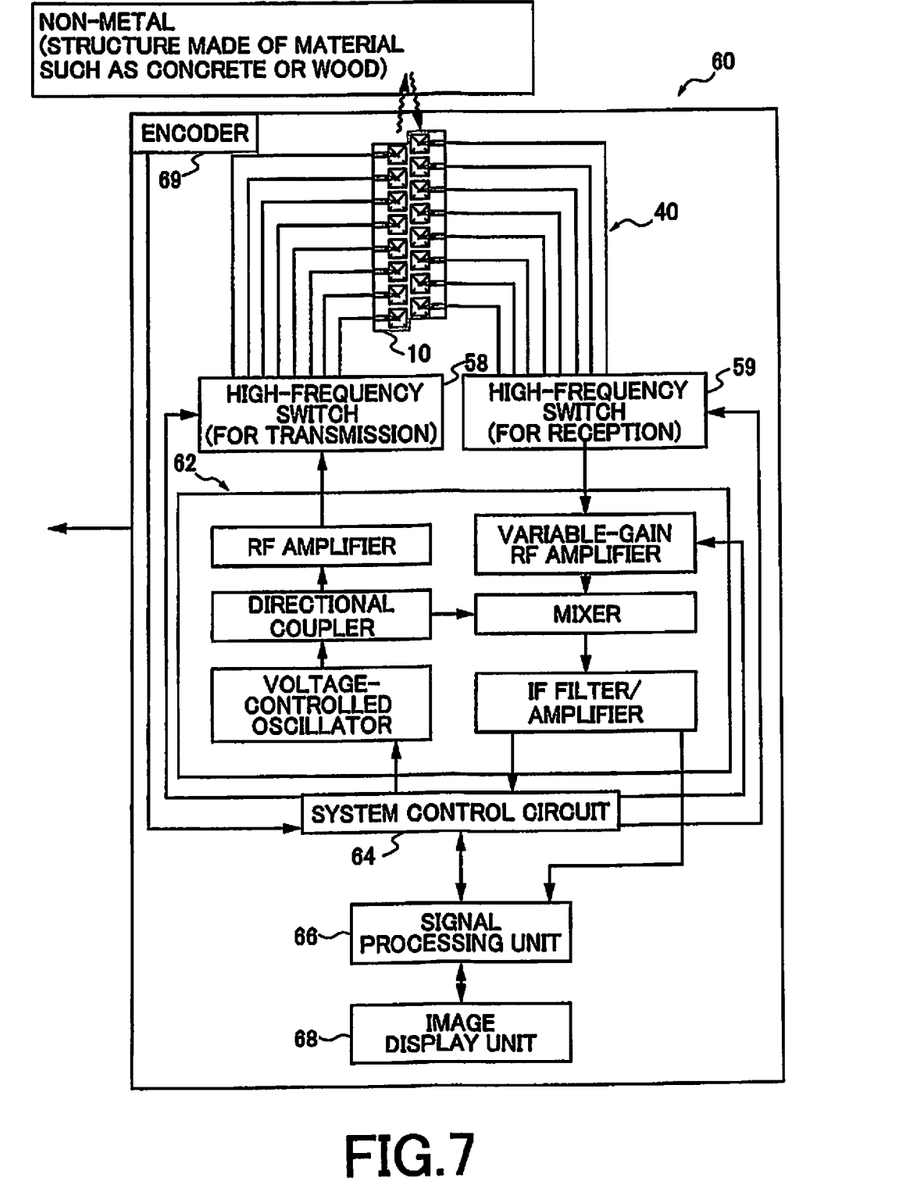
FIG. 7 is a block configuration diagram of an example of a radar apparatus according to a disclosed embodiment.

Such a transmitter and receiver module 40 can be suitably used in a radar apparatus 60. FIG. 7 is a block configuration diagram of an example of the radar apparatus 60. The radar apparatus 60 has a transmitter and receiver module 40 including a transmission array antenna 50, a reception array antenna 52, and high-frequency switches 58 and 59; a high-frequency circuit 62; a system control circuit 64; a signal processing unit 66; and an image display unit 68.

Specifically, the radar apparatus 60 includes the transmission array antenna 50 that has a plurality of the above-described planar antennas 10 arranged therein and that radiates an electromagnetic wave to an object; the reception array antenna 52 that has a plurality of the above-described planar antennas 10 arranged therein and that receives an electromagnetic wave reflected from the object; the high-frequency circuit 62 that processes the receive signal received by the reception array antenna 52, using the transmit signal used by the transmission array antenna 50; the signal processing unit 66 that obtains a three-dimensional image signal related to the object, using the processed signal obtained by the high-frequency circuit 62; and the image display unit 68 that displays the processing result. The system control circuit 64 controls transmission by the transmission array antenna 50, reception by the reception array antenna 52, a process for the receive signal, and obtaining of the three-dimensional image signal.

Such a radar apparatus 60 radiates an electromagnetic wave while the transmission array antenna 50 and the reception array antenna 52 move in parallel to the object, and switching the plurality of planar antennas 10 of the transmission array antenna 50 by the high-frequency switch 58 on a movement basis of the transmission array antenna 50 and the reception array antenna 52. Movement of the transmission array antenna 50 and the reception array antenna 52 is detected by an encoder 69 that is integrally provided on a substrate where the transmission array antenna 50 and the reception array antenna 52 are provided and that outputs a signal on a set movement distance basis. Movement of the transmission array antenna 50 and the reception array antenna 52 is performed by a moving apparatus (not illustrated). By the moving apparatus, a measurement target object can move relative to the radar apparatus 60. Note that the arrangement directions of the planar antennas 10 of the transmission array antenna 50 and the reception array antenna 52 can be vertical to a moving direction of the object, in terms of that a three-dimensional image can be scanned in the moving direction. At this time, the high-frequency switch 59 repeats a process in which, every time each individual planar antenna 10 of the transmission array antenna 50 performs transmission, the plurality of planar antennas 10 of the reception array antenna 52 perform reception in a switching manner. Then, the signal processing unit 66 obtains a three-dimensional image signal from a processed signal obtained by transmission and reception of electromagnetic waves. Using the obtained three-dimensional image signal, a three-dimensional image of the inside of the object is created and displayed on the image display unit 68.

Although in this embodiment the encoder 69 is used as a sensor that outputs a signal on a set movement distance basis, the sensor is not limited to the encoder 69. Any sensor may be used that outputs a signal on a set movement distance basis in order to perform transmission by the transmission array antenna 50 and reception by the reception array antenna 52 on a set movement distance basis regarding a movement distance at which an object which is a measurement target non-metallic structure moves relative to the radar apparatus 60. The radar apparatus 60 of the present embodiment moves relative to a measurement target object, but the radar apparatus 60 and the object do not need to move relative to each other.

At this time, the plurality of planar antennas 10 of the reception array antenna 52 receives a reflected wave of an electromagnetic wave radiated from a planar antenna 10 of the transmission array antenna 50. A reception microwave amplifier (RF amplifier) may perform setting such that the gain is changed for each pair of a planar antenna 10 that performs transmission and a planar antenna 10 that performs reception. By having a variable-gain amplification function that changes the gain according to the selection of a pair of a planar antenna 10 that performs transmission and a planar antenna 10 that performs reception, the inspectable depth of defects, etc., in the object can be increased.

The planar antenna 10 of this embodiment can be suitably used in such a radar apparatus 60. Although the radar apparatus 60 illustrated in FIG. 7 has the high-frequency switches 58 and 59, the planar antenna 10 of the present embodiment can also be applied to a radar apparatus that does not have the high-frequency switches 58 and 59.

Although embodiments of a planar antenna and a radar apparatus are described in detail above, the present invention is not limited to the above-described embodiment and examples, and various modifications and changes may, of course, be made without departing from the spirit of the present invention.

What is claimed is:

1. A planar antenna comprising:
   a dielectric substrate;
   an antenna main body portion including a first antenna element provided on a first side of the dielectric substrate and a second antenna element provided on a second side of the dielectric substrate, the first antenna element and the second antenna element functioning as a balanced antenna;
   a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween;
   first ground conductors provided on the first side to sandwich the signal line with spacing therebetween, the first ground conductors forming a coplanar line with the signal line;
   a second ground conductor provided in an identical region of the second side of the dielectric substrate to a region of the first side where the coplanar line is present, with the dielectric substrate sandwiched therebetween, the second ground conductor being connected to the second feed line; and
   via holes connecting the first ground conductors to the second ground conductor provided at ends of edges of the first ground conductors facing the end of the signal line where the signal line is connected to the first feed line, to allow the first feed line and the second feed line function as balanced transmission lines.

2. The planar antenna according to claim 1, wherein the signal line portion includes a matching circuit that achieves impedance matching between the antenna main body portion and the signal line portion, by providing two width narrow portions whose line widths get continuously thinner toward a feed point of the first antenna element or the second antenna element in a single line of the signal line portion.

3. The planar antenna according to claim 2, wherein one of the width narrow portions that achieve impedance matching is provided on the first feed line.

4. The planar antenna according to claim 3, wherein
   an extended ground conductors extending from the first ground conductors is provided to cover a perimeter of the first antenna element and to be spaced apart from the first antenna element, and an extended ground conductor extending from the second ground conductor is provided to cover a perimeter of the second antenna element and to be spaced apart from the second antenna element; and
   a resistance element is provided between each of the first antenna element and the second antenna element and each of the extended ground conductors.

5. The planar antenna according to claim 4, wherein each of the first antenna element and the second antenna element is connected to each extended ground conductor through the resistance element at a location farthest from each feed points.

6. The planar antenna according to claim 2, wherein the first antenna element and the second antenna element form self-complementary antenna elements;
   the first feed line has a first portion whose line width gets continuously thinner toward the feed point, as one of the width narrow portions;
   the second feed line has a second portion whose line width gets continuously thinner toward the feed point;
   the signal line has a third portion whose line width gets continuously thinner toward the feed point, as one of the width narrow portions; and
   the first portion and the second portion are provided at identical locations with the dielectric substrate sandwiched therebetween.

7. The planar antenna according to claim 6, wherein
   the third portion ends at the end of the signal line connected to the first feed line, and the first portion of the first feed line starts from an end of the first feed line connected to the end of the signal line; and
   when going from the third portion to a connecting portion of the first portion, the line width gets wider so as to have a step between the third portion and the connecting portion.

8. The planar antenna according to claim 7, wherein a total of a length of the first portion in an extending direction of the first feed line and a length of the third portion in an extending direction of the signal line is equal to a line length from a starting location of the third portion to the feed point of the first antenna element.

9. The planar antenna according to claim 1, wherein a plurality of via holes that connect the first ground conductors to the second ground conductor are provided along edges of the first ground conductors facing the signal line.

10. A radar apparatus comprising:
    a transmission array antenna that has a plurality of transmission planar antennas arranged therein, the transmission array antenna operable to radiate an electromagnetic wave to an object, each of the transmission planar antennas comprising:
    a dielectric substrate;
    an antenna main body portion including a first antenna element provided on a first side of the dielectric substrate and a second antenna element provided on a second side of the dielectric substrate, the first antenna element and the second antenna element functioning as a balanced antenna;
    a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween;

first ground conductors provided on the first side to sandwich the signal line with spacing therebetween, the first ground conductors forming a coplanar line with the signal line;

a second ground conductor provided in an identical region of the second side of the dielectric substrate to a region of the first side where the coplanar line is present, with the dielectric substrate sandwiched therebetween, the second ground conductor being connected to the second feed line; and via holes connecting the first ground conductors to the second ground conductor provided at ends of edges of the first ground conductors facing the end of the signal line where the signal line is connected to the first feed line, to allow the first feed line and the second feed line function as balanced transmission lines;

a reception array antenna that has a plurality of reception planar antennas arranged therein, the a reception array antenna being operable to receive an electromagnetic wave reflected from the object, each of the reception planar antennas comprising:

a dielectric substrate;

an antenna main body portion including a first antenna element provided on a first side of the dielectric substrate and a second antenna element provided on a second side of the dielectric substrate, the first antenna element and the second antenna element functioning as a balanced antenna;

a signal line portion including a first feed line provided on the first side and connected to a feed point of the first antenna element for feeding power to the first antenna element, a second feed line on the second side and connected to a feed point of the second antenna element for feeding power to the second antenna element, and a signal line provided on the first side and connected to the first feed line, the first feed line and the second feed line forming a pair of feed lines provided at identical locations with the dielectric substrate sandwiched therebetween;

first ground conductors provided on the first side to sandwich the signal line with spacing therebetween, the first ground conductors forming a coplanar line with the signal line;

a second ground conductor provided in an identical region of the second side of the dielectric substrate to a region of the first side where the coplanar line is present, with the dielectric substrate sandwiched therebetween, the second ground conductor being connected to the second feed line; and via holes connecting the first ground conductors to the second ground conductor provided at ends of edges of the first ground conductors facing the end of the signal line where the signal line is connected to the first feed line, to allow the first feed line and the second feed line function as balanced transmission lines;

a high-frequency circuit operable to process a receive signal received by the reception array antenna, using a transmit signal used by the transmission array antenna;

a signal processing unit operable to obtain a three-dimensional image signal related to the object, using the processed signal obtained by the high-frequency circuit;

a system control circuit operable to control transmission by the transmission array antenna, reception by the reception array antenna, a process for the receive signal, and obtaining of the three-dimensional image signal; and an image display unit operable to create a three-dimensional image, using the three-dimensional image signal.

11. The radar apparatus according to claim 10, wherein the high-frequency circuit includes a high-frequency switch operable to select one transmission planar antenna to which the transmit signal is supplied, from within the transmission array antenna; and a high-frequency switch operable to select one reception planar antenna from within the reception array antenna.

12. The radar apparatus according to claim 10, further comprising:

a moving apparatus operable to allow the object to move relative to the radar apparatus; and a sensor operable to output a signal on a set movement distance basis in order to perform transmission by the transmission array antenna and reception by the reception array antenna on a set movement distance basis regarding a movement distance at which the object moves relative to the radar apparatus.

13. The radar apparatus according to claim 10, wherein the transmission array antenna and the reception array antenna are provided on a single common dielectric substrate, and the reception planar antennas of the reception array antenna are arranged in parallel to an arrangement direction of the transmission planar antennas of the transmission array antenna.

14. The radar apparatus according to claim 13, wherein the object moves relative to the radar apparatus, and the arrangement direction of the transmission planar antennas of the transmission array antenna and an arrangement direction of the reception planar antennas of the reception array antenna are vertical to a moving direction of the object.

15. The radar apparatus according to claim 10, wherein the signal line portion includes a matching circuit that achieves impedance matching between the antenna main body portion and the signal line portion, by providing two width narrow portions whose line widths get continuously thinner toward a feed point of the first antenna element or the second antenna element in a single line of the signal line portion.

16. The radar apparatus according to claim 15, wherein one of the width narrow portions that achieve impedance matching is provided on the first feed line.

17. The radar apparatus according to claim 16, wherein an extended ground conductors extending from the first ground conductors is provided to cover a perimeter of the first antenna element and to be spaced apart from the first antenna element, and an extended ground conductor extending from the second ground conductor is provided to cover a perimeter of the second antenna element and to be spaced apart from the second antenna element; and a resistance element is provided between each of the first antenna element and the second antenna element and each of the extended ground conductors.

18. The radar apparatus according to claim 15, wherein
the first antenna element and the second antenna element form self-complementary antenna elements;
the first feed line has a first portion whose line width gets continuously thinner toward the feed point, as one of the width narrow portions;
the second feed line has a second portion whose line width gets continuously thinner toward the feed point;
the signal line has a third portion whose line width gets continuously thinner toward the feed point, as one of the width narrow portions; and
the first portion and the second portion are provided at identical locations with the dielectric substrate sandwiched therebetween.

19. The radar apparatus according to claim 18, wherein
the third portion ends at the end of the signal line connected to the first feed line, and the first portion of the first feed line starts from an end of the first feed line connected to the end of the signal line; and
when going from the third portion to a connecting portion of the first portion, the line width gets wider so as to have a step between the third portion and the connecting portion.

20. The radar apparatus according to claim 19, wherein a total of a length of the first portion in an extending direction of the first feed line and a length of the third portion in an extending direction of the signal line is equal to a line length from a starting location of the third portion to the feed point of the first antenna element.

* * * * *